United States Patent
Hansen et al.

(10) Patent No.: US 12,250,479 B2
(45) Date of Patent: Mar. 11, 2025

(54) UNIT CELL SELECTION VERIFICATION SYSTEMS AND METHODS

(71) Applicant: Teledyne FLIR Commercial Systems, Inc., Goleta, CA (US)

(72) Inventors: Randy J Hansen, Goleta, CA (US); Naseem Y. Aziz, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 192 days.

(21) Appl. No.: 17/974,255

(22) Filed: Oct. 26, 2022

(65) Prior Publication Data

US 2023/0063513 A1  Mar. 2, 2023

Related U.S. Application Data

(63) Continuation of application No. 17/970,432, filed on Oct. 20, 2022, and a continuation of application No. PCT/US2021/030018, filed on Apr. 29, 2021, said application No. 17/970,432 is a continuation of (Continued)

(51) Int. Cl.
*H04N 25/74* (2023.01)
*H04N 25/50* (2023.01)
*H04N 25/75* (2023.01)
*H04N 25/77* (2023.01)

(52) U.S. Cl.
CPC ............ *H04N 25/74* (2023.01); *H04N 25/50* (2023.01); *H04N 25/75* (2023.01); *H04N 25/77* (2023.01)

(58) Field of Classification Search
CPC ........ H04N 5/33; H04N 17/002; H04N 25/50; H04N 25/60; H04N 25/74; H04N 25/75; H04N 25/77
See application file for complete search history.

(56) References Cited

U.S. PATENT DOCUMENTS 6,249,002 B1 * 6/2001 Butler ................. H04N 5/33
 250/370.08
6,388,245 B1 5/2002 Lee
(Continued)

FOREIGN PATENT DOCUMENTS

CN 106797440 A 5/2017
WO WO 91/04498 4/1991

*Primary Examiner* — Lin Ye
*Assistant Examiner* — Chriss S Yoder, III
(74) *Attorney, Agent, or Firm* — Haynes and Boone, LLP

(57) ABSTRACT

Techniques for facilitating unit cell selection verification systems and methods are provided. In one example, a method includes detecting, by each detector of a focal plane array (FPA), electromagnetic radiation. Each detector is selectively coupled to a readout circuit of the FPA via a selection circuit of the FPA. The method further includes, during a frame period, applying a predetermined signal pattern to a portion of the selection circuit, where the portion is associated with a subset of detectors of the FPA, and performing a readout of the FPA to obtain a respective output signal associated with each respective detector of the FPA. The method further includes determining whether the portion of the selection circuit is operating properly based at least on the output signal associated with the detectors of the subset from the readout. Related systems and devices are also provided.

20 Claims, 6 Drawing Sheets

Related U.S. Application Data application No. PCT/US2021/030025, filed on Apr. 29, 2021.

(60) Provisional application No. 63/031,383, filed on May 28, 2020, provisional application No. 63/018,446, filed on Apr. 30, 2020.

(56) References Cited

U.S. PATENT DOCUMENTS

| | | | |
|---|---|---|---|
| 7,679,048 B1 * | 3/2010 | Aziz | G01J 5/02 |
| | | | 250/252.1 |
| 8,953,047 B2 | 2/2015 | Martinussen | |
| 9,161,028 B2 | 10/2015 | Solhusvik et al. | |
| 9,407,848 B2 | 8/2016 | Yaghmai | |
| 2013/0075584 A1 | 3/2013 | Yaghmai et al. | |
| 2013/0083204 A1 | 4/2013 | Solhusvik et al. | |
| 2015/0288907 A1 | 10/2015 | Vampola et al. | |
| 2016/0295205 A1 | 10/2016 | Lim et al. | |
| 2019/0149758 A1 | 5/2019 | Nakamura | |
| 2019/0335118 A1 | 10/2019 | Simolon et al. | |
| 2020/0137323 A1 | 4/2020 | Sawada | |
| 2020/0251513 A1 | 8/2020 | Noudo | |

* cited by examiner

UNIT CELL SELECTION VERIFICATION SYSTEMS AND METHODS

CROSS-REFERENCE TO RELATED APPLICATIONS

This application is a continuation of International Patent Application No. PCT/US2021/030018 filed Apr. 29, 2021 and entitled "IMAGING METHOD AND IMAGING DEVICE WITH UNIT CELL SELECTION VERIFICATION," which claims the benefit of U.S. Provisional Patent Application No. 63/018,446 filed Apr. 30, 2020 and entitled "UNIT CELL SELECTION VERIFICATION SYSTEMS AND METHODS," all of which are incorporated herein by reference in their entirety.

This application is a continuation-in-part to U.S. patent application Ser. No. 17/970,432 filed Oct. 20, 2022 and entitled "READOUT ADDRESSING VERIFICATION SYSTEMS AND METHODS," which is a continuation of International Patent Application No. PCT/US2021/030025 filed Apr. 29, 2021 and entitled "IMAGE SENSOR READOUT ADDRESSING VERIFICATION METHOD AND DEVICE," which claims priority to and the benefit of U.S. Provisional Patent Application No. 63/031,383 filed May 28, 2020 and entitled "READOUT ADDRESSING VERIFICATION SYSTEMS AND METHODS," and U.S. Provisional Patent Application No. 63/018,446 filed Apr. 30, 2020 and entitled "UNIT CELL SELECTION VERIFICATION SYSTEMS AND METHODS," and all of which are incorporated herein by reference in their entirety.

TECHNICAL FIELD

One or more embodiments relate generally to imaging and more particularly, for example, to unit cell selection verification systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes detecting, by each detector of a focal plane array, electromagnetic radiation. Each detector is selectively coupled to a readout circuit of the focal plane array via a selection circuit of the focal plane array. The method further includes, during a frame period, applying a predetermined signal pattern to a portion of the selection circuit, where the portion of the selection circuit is associated with a subset of detectors of the focal plane array, and performing a readout of the focal plane array to obtain a respective output signal associated with each respective detector of the focal plane array. The method further includes determining whether the portion of the selection circuit is operating properly based at least on the output signal associated with the detectors of the subset from the readout.

In one or more embodiments, an imaging device includes a focal plane array. The focal plane array includes a detector array, a readout circuit, and a selection circuit. The detector array includes a plurality of detectors, where each detector is configured to detect electromagnetic radiation. The readout circuit is configured to perform, during a frame period, a readout to obtain a respective output signal associated with each respective detector of the detector array. The selection circuit is configured to selectively couple the detector array to the readout circuit. The imaging device further includes a control signal generator configured to apply, during the frame period, a predetermined signal pattern to a portion of the selection circuit, where the portion of the selection circuit is associated with a subset of detectors of the detector array. The imaging device further includes a verification device configured to determine whether the portion of the selection circuit is operating properly based at least on the output signal associated with the detectors of the subset from the readout.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
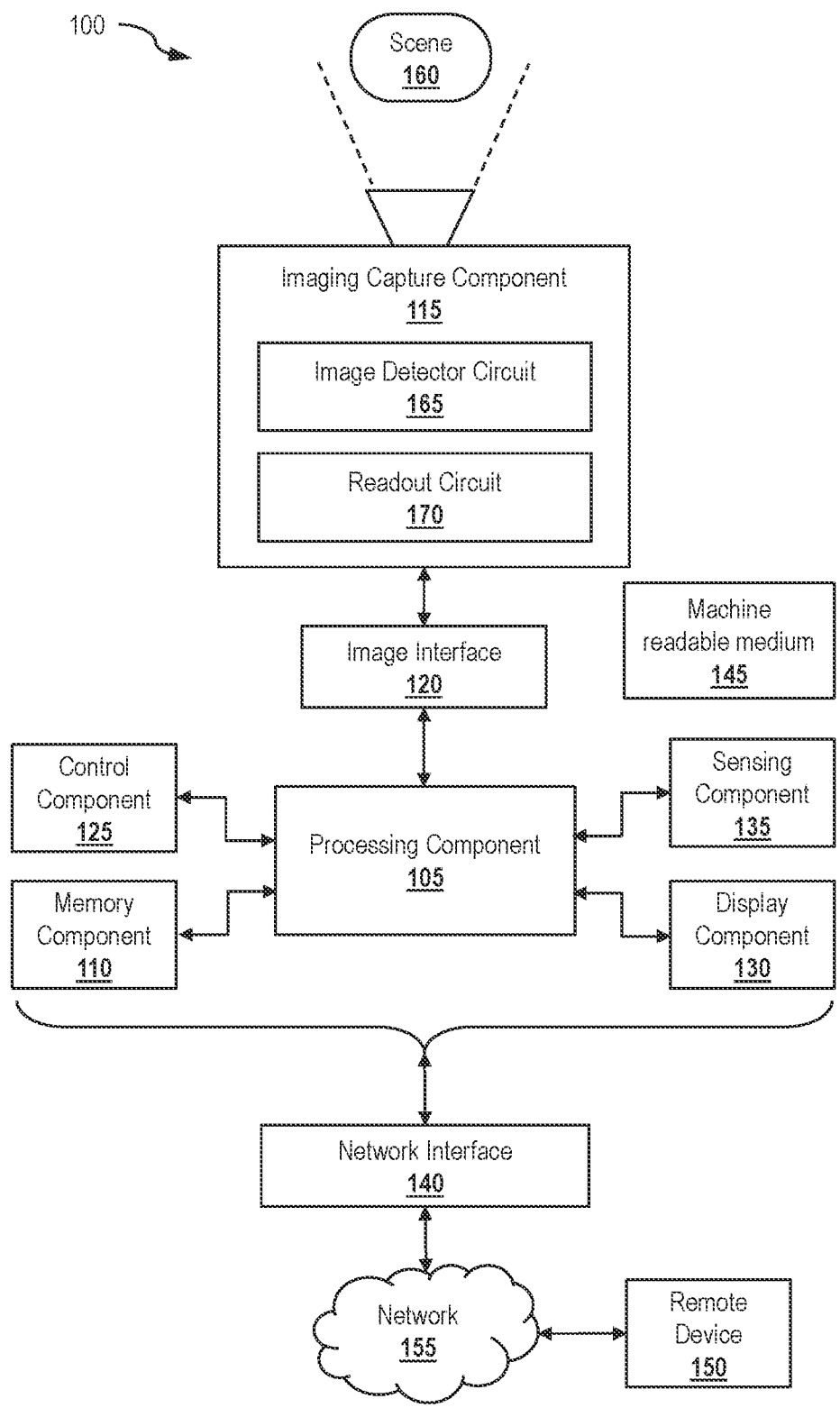
FIG. 1 illustrates a block diagram of an example imaging system in accordance with one or more embodiments of the present disclosure.

Embodiments of the present disclosure and their advantages are best understood by referring to the detailed

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate unit cell selection verification systems and methods. In some embodiments, a unit cell of a unit cell array includes a detector and selection circuitry associated with the detector. The unit cell array thus includes a detector array formed of detectors (e.g., also referred to as detector pixels, detector elements, or simply pixels) and a portion of a selection circuit. Selection circuitry associated with a detector is a portion of the selection circuit. Each detector pixel detects image data associated with components of incident EM radiation and generates detection signals (e.g., electrical signals) indicative of the detected image data. The signals may include photocurrent generated by the detector element in response to incident EM radiation. For explanatory purposes, the selection circuit is considered an interface between the detectors and a readout circuit, since the selection circuit selectively couples the detectors to the readout circuit. As such, the selection circuitry may also be referred to as an interface circuitry. In other aspects, the selection circuitry may be considered a part of the readout circuit.

Readout of these detection signals involves selecting/addressing the unit cells (e.g., selection of the detectors). For example, the unit cells may be selected row-by-row to allow readout of the unit cells row-by-row. In some embodiment, the selection circuitry associated with a given unit cell may include switches. Each switch of the unit cell may be controlled using a corresponding control signal. The switches may be appropriately turned on (e.g., closed) and turned off (e.g., open) to bias the detector, capture data from the associated detector, and provide the data to the readout circuit. In some aspects, the switches may be implemented using transistors. In one example, a unit cell has three transistors, with a state (e.g., on or off state) of each transistor being based on a control signal applied to the transistor. Unit cell selection verification may be performed to verify that the selection circuitry (e.g., each switch) of each unit cell is operating properly.

Various embodiments of methods and systems disclosed herein may be included in or implemented as various devices and systems such as visible-light imaging systems, infrared imaging systems, imaging systems having visible-light and infrared imaging capability, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 100 in FIG. 1 may represent the housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). In some cases, the image capture component 115 does not have a shutter, such that the image detector circuit 165 is exposed to a scene encompassed by a field of view of the image capture component 115. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may comprise an IR imaging sensor having an FPA of detectors responsive to IR radiation including near infrared (NIR), short-wave IR (SWIR), MWIR, long-wave IR (LWIR), and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
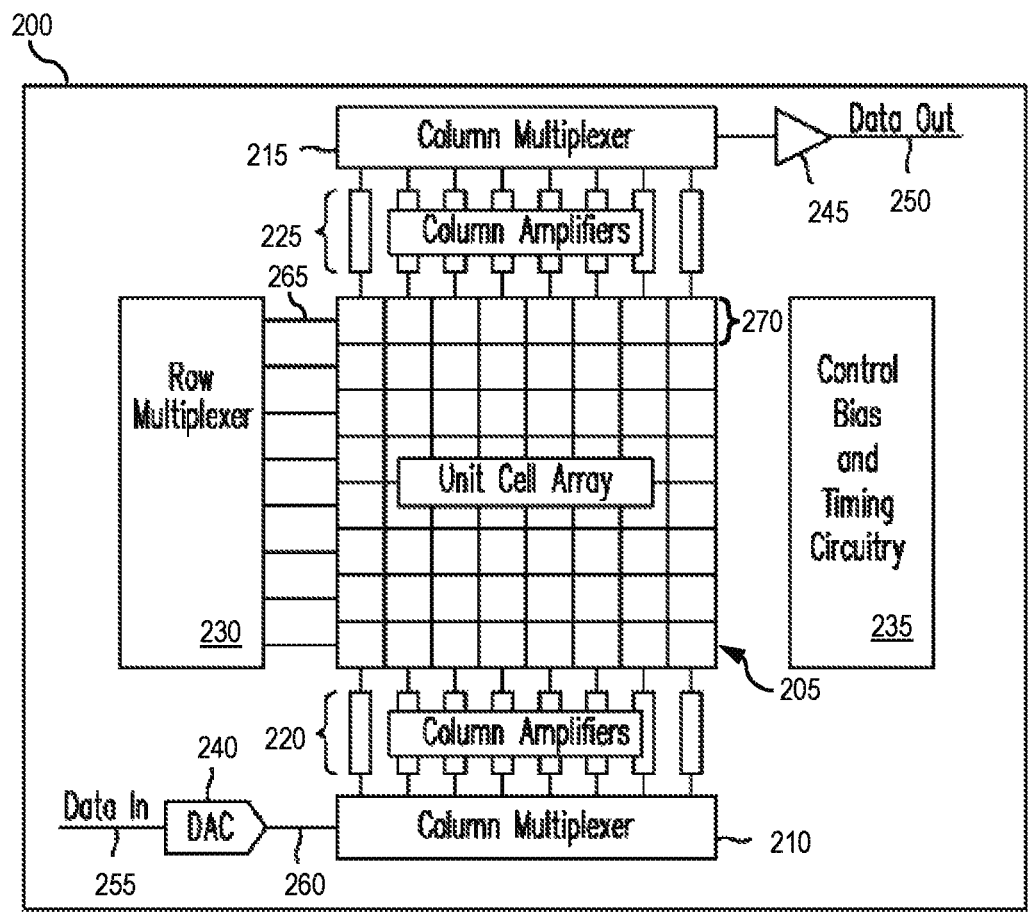
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the imaging capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In an embodiment, components of the image sensor assembly 200 may be implemented such that the unit cell array 205 is hybridized to (e.g., bonded to, joined to, mated to) the ROIC.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In some embodiments, the bias values may be, or may be derived into, the control signals for addressing the unit cell array 205 (e.g., to turn on or turn off switches of a selection circuit). In this regard, the bias values may refer to the analog signals that are at an appropriate logic high level or appropriate logic low level to cause switches of a selection circuit to turn on or turn off, or the bias values may refer to digital control signals (e.g., bits) that are used to derive the appropriate logic high level or appropriate logic low level.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Each row of the unit cell array 205 may be addressed using a control signal(s) from the row multiplexer 230. In some cases, the row multiplexer 230 may receive the control signal(s) from the control bias and timing circuitry 235. Although FIG. 2 illustrates a single line from the row multiplexer 230 to each row of the unit cell array 205, such as a single control line 265 associated with a row 270 of the unit cell array, the single line may represent multiple control lines. Each of these lines may be associated with a control signal. In some embodiments, each row may be controlled using three control signals.

Figure 3:
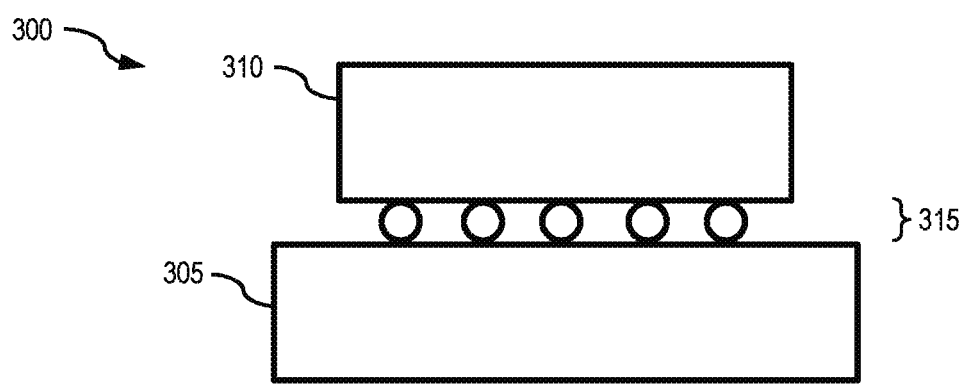
FIG. 3 illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

Figure 4:
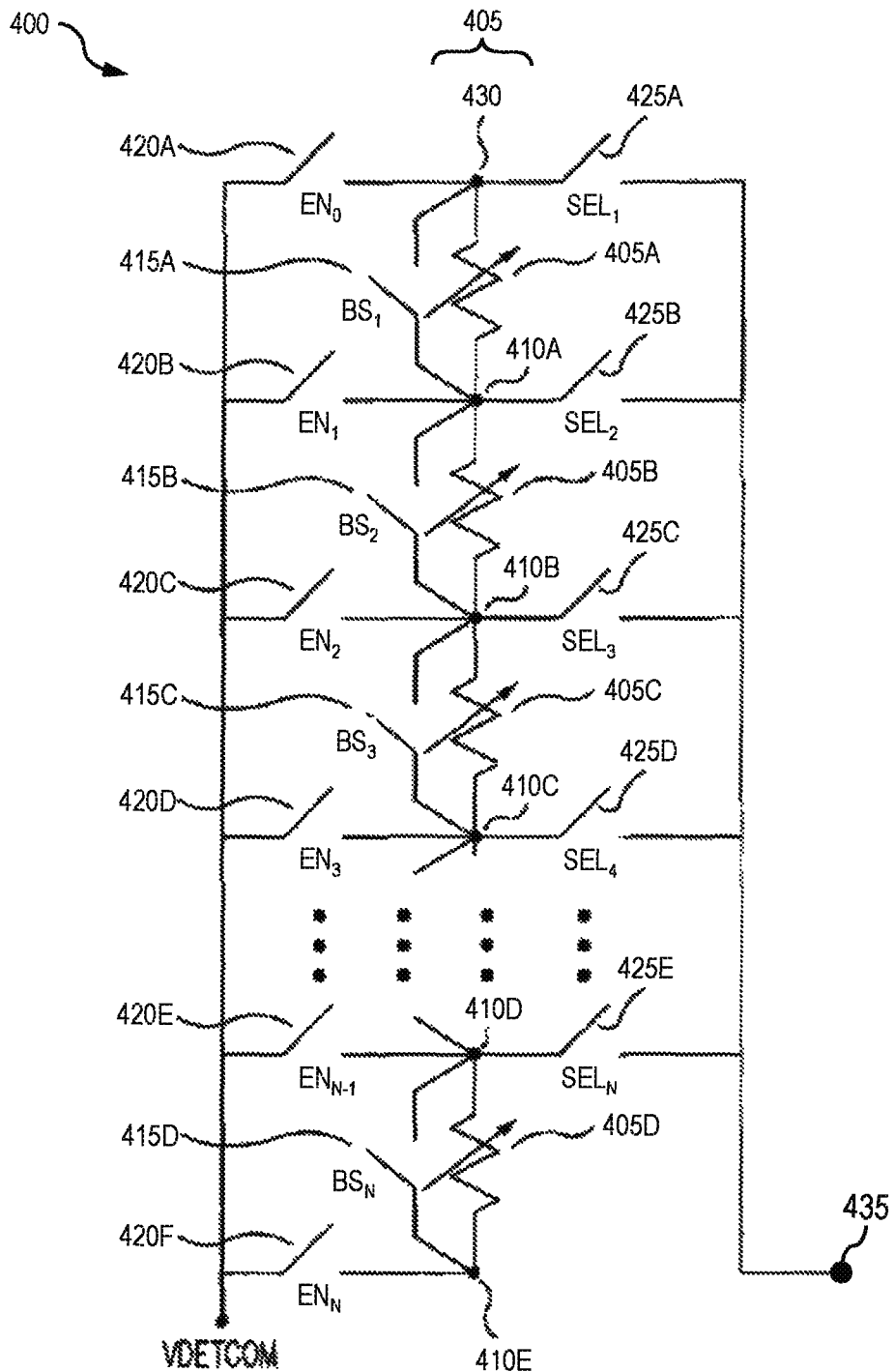
FIG. 4 illustrates a circuit that includes a detector string and associated selection circuitry in accordance with one or more embodiments of the present disclosure.

FIG. 4 illustrates a circuit 400 that includes a detector string 405 and an associated selection circuitry in accordance with one or more embodiments of the present disclosure. The circuit 400 is described with reference to FIG. 5, which illustrates an example timing diagram 500 for the selection circuit of FIG. 4 for facilitating readout of the detector string 405 (e.g., a detector array that includes the detector string 405) in accordance with one or more embodiments of the present disclosure. In an embodiment, a unit cell of the unit cell array 205 includes a detector of the detector string 405 and a portion of the selection circuit (e.g., also referred to as an interface circuit) associated with the detector.

The detector string 405 of the circuit 400 includes detectors 405A-D (e.g., infrared sensors). Each of contacts 410A-E is shared by detectors of the detector string 405. For example, the detectors 405A and 405B share the contact 410A, and the detectors 405B and 405C share the contact 410B. By sharing contacts, the number of contacts for the detector is reduced and, consequently, the amount of area needed for contacts is reduced. In an embodiment, the detector string 405 may be, or may be a part of, a row or a column in an array of detectors. In some cases, the contacts 410A-E may be shared between adjacent columns or rows (e.g., also referred to as neighboring columns or rows) of the array. It is noted that reference to a column or a row may include a partial column or a partial row and that the column and row terminology may be interchangeable, depending upon the application. For explanatory purposes, the detector string 405 is a column (or portion thereof) of the array, and each of the detectors 405A-D is part of a different row of the array. In this regard, the detectors string 405 has N rows. Ellipses between the detectors 405C and 405D indicate that one or more additional detectors are present between the detectors 405C and 405D or no detectors are present between the detectors 405C and 405D. The number of columns and rows of a detector array may vary, depending for example on a desired application, with the circuit 400 replicated to form the desired number of additional columns. Although the detector array is represented as variable resistors and may be a microbolometer array, other types of detectors may be utilized.

The selection circuit of the circuit 400 includes switches 415A-D, switches 420A-F, and switches 425A-E. In some embodiments, the switches 415A-D, the switches 420A-F, and/or the switches 425A-F may be implemented using transistors. The switches 415A-D are in parallel with the detectors 405A-D. In FIG. 4, each of the switches 415A-D, the switches 420A-F, and the switches 425A-E is controlled by a control signal depicted adjacent to the associated switch. For example, a control signal $BS_3$ can be asserted to turn on (e.g., close) and deasserted to turn off (e.g., open) the switch 415C, a control signal $EN_{N-1}$ can be asserted to turn on and deasserted to turn off the switch 420E, a control signal $SEL_1$ can be asserted to turn on and deasserted to turn off the switch 425A, and so forth. In an aspect, the control signals (e.g., with appropriate timing) may be provided to the selection circuit by a readout circuit (e.g., the readout circuit 170) and/or a processing circuit (e.g., the processing component 105). With reference to FIG. 2, for the row 270 of the unit cell array 205, the row multiplexer 230 may provide the control signals on the line(s) 265. For example, if the row 270 includes the detector 405A, the control signals provided on the line(s) 265 may include $BS_1$, $EN_1$, and $SEL_1$. For explanatory purposes, in FIGS. 4 and 5, each of the switches (e.g., 415A-D, 420A-F, and 425A-E) turns on in response to a logic high control signal and turns off in response to a logic low signal. However, depending on type of switching technology utilized, a switch may turn off in response to a logic high control signal and turn on in response to a logic low control signal.

Control signals $BS_1$ through $BS_N$ are used to control the switches 415A-D to selectively short the detectors 405A-D. As such, the switches 415A-D may be referred to as bolometer short (BS) switches. In some cases, the switches 415A-D are used to isolate their respective detectors 405A-D. Such isolation may reduce parasitic capacitances and/or resolve performance issues. In some cases, by controlling the on/off state of the switches 415A-D and applying appropriate timing (e.g., as discussed with reference to FIG. 5), a reduced sensitivity to defects (e.g., column-to-column short defect) may be provided, which may result in less noise, crosstalk, and/or reduced parasitic capacitance within the FPA.

Control signals $EN_0$ through $EN_N$ are used to control the corresponding switches 420A-F. The switches 420A-F selectively couple the detectors 405A-D to a bias signal $V_{DETCOM}$ (e.g., also referred to as a reference voltage). Control signals $SEL_1$ through $SEL_N$ may be used to control the corresponding switches 425A-D. The switches 425A-D selectively couple the detectors 405A-D to a node 435. The node 435 may be connected the ROIC, such that the switches 425A-D selectively couple the detectors 405A-D to the ROIC. For example, if the control signal $SEL_1$ is asserted, the switch 425A is closed (e.g., turned on) and the detector 405A provides a signal (e.g., indicative of radiation received by the detector 405A) to the ROIC. In a similar manner, the detectors 405A-D may be selected, for example, row by row in a sequential fashion using their respective set of control signals. The control signals $EN_0$ through $EN_N$ and $SEL_1$ through $SEL_N$ may be collectively set to control corresponding switches 420A-F and 425A-E for selecting/addressing the row, while the control signals $BS_1$ through $BS_N$ are used to control the corresponding switches 415A-D (e.g., for isolation purposes). As such, the control signals may be referred to as column/row select signals, column/row address signals, or address signals.

Figure 5:
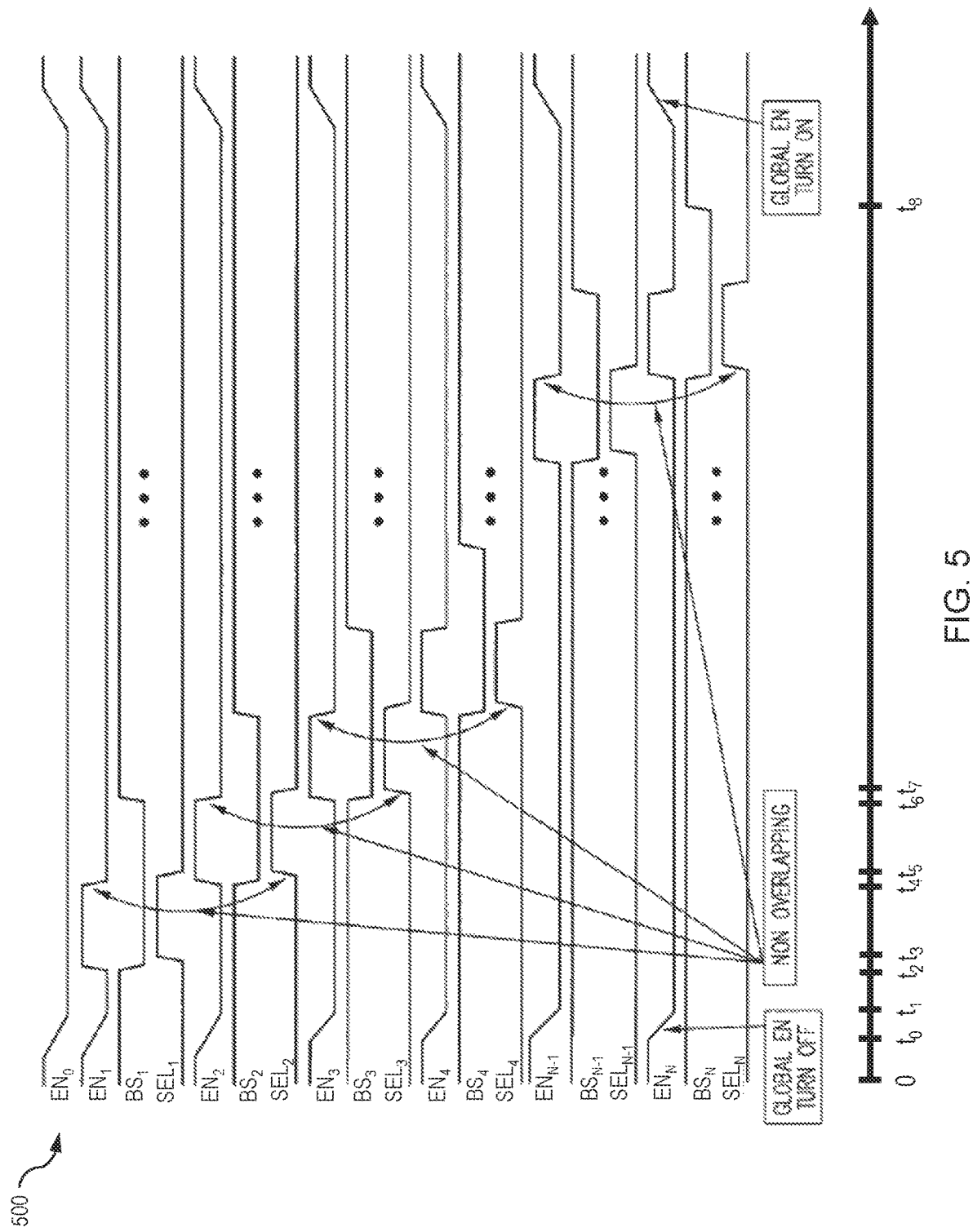
FIG. 5 illustrates an example timing diagram for the selection circuitry of FIG. 4 in accordance with one or more embodiments of the present disclosure.

A sequence of operations of the circuit 400 is described with additional reference to FIG. 5, which illustrates the example timing diagram 500 for the selection circuit of FIG. 4 for facilitating readout of the detector string 405 (e.g., readout of a detector array that includes the detector string 405) in accordance with one or more embodiments of the present disclosure. The timing diagram 500 provides a normal signal pattern sequence for the selection circuit associated with each of the detectors of the detector string 405. In an aspect, the normal signal pattern sequence refers to a state (e.g., logic high, logic low) of the control signals $BS_x$, $EN_x$, and $SEL_x$ as a function of time during normal operation, in which each row of detectors is read out in a sequential fashion.

With reference to FIGS. 4 and 5, to initialize the detector array and the associated selection circuit for a frame period, the control signals $EN_0$ through $EN_N$ are asserted (e.g., at a logic high) to close the associated switches 420A through 420F and apply the reference voltage $V_{DETCOM}$ to the detectors 405A through 405D, the control signals $BS_1$ through $BS_N$ are asserted to close the associated switches 415A through 415D, and the control signals $SEL_1$ through $SEL_N$ are deasserted (e.g., at a logic low) to open the associated switches 425A through 425E. As shown in FIG. 5, a time t=0 is set to a time at which such initialization occurs. From around a time t=$t_0$ to around a time t=$t_1$>$t_0$, a global EN signal turn off is performed to transition the control signals $EN_0$ through $EN_N$ to a deasserted state. The control signals $EN_0$ through $EN_N$ are deasserted to open the associated switches 420A through 420F.

The sequence of operations of the circuit 400 then proceeds to facilitate readout of the detector 405A (e.g., facilitate readout of the row of detectors that includes the detector 405A). At around a time t=$t_2$>$t_1$, the control signal $EN_1$ is asserted to close the switch 420B and the control signal $BS_1$ is deasserted to open the switch 415A. With the switch 420B closed, the detector 405A is coupled to the reference voltage $V_{DETCOM}$. At around a time t=$t_3$>$t_2$, the control signal $SEL_1$ is asserted to close the switch 425A. With the switches 420B and 425A closed and the switch 415A open (and the remaining switches controlled using their respective control signals as shown in FIG. 5), the detector 405A provides an output signal to circuitry of the ROIC. The output signal may be a detection signal generated based on a radiation detected by the detector 405A. In some cases, the output signal may be a current that flows through the switch 420B, the detector 405A, and the switch 425A.

The sequence of operations of the circuit 400 then proceeds to facilitate readout of the detector 405B (e.g., facilitate readout of the row of detectors that includes the detector 405B). At around a time t=$t_4$>$t_3$, the control signals $EN_1$ and $BS_2$ are deasserted to open the switches 420B and 415B, respectively, to remove (e.g., disconnect, decouple) the reference voltage $V_{DETCOM}$ from the detector 405A and remove the short across the detector 405B. The control signal $EN_2$ is then asserted to close the switch 420C. At around a time t=$t_5$>$t_4$, the control signal $SEL_1$ is deasserted to open the switch 425A and the control signal $SEL_2$ is asserted to close the switch 425B. With the switch 425A open and the switch 425B closed, the detector 405B can be read out. In this regard, the detector 405B provides a signal (e.g., current flowing through the switch 425B, the detector 405B, and the switch 420C) to circuitry of the ROIC. The detector 405A, with the switch 415A open, functions to isolate the detector 405B from a potential short (e.g., a column-to-column defect) at a node 430.

The sequence of operations of the circuit 400 then proceeds to facilitate readout of the detector 405C (e.g., facilitate readout of the row of detectors that includes the detector 405C). At around a time t=$t_6$>$t_5$, the control signals $EN_2$ and $BS_3$ are deasserted to open the switches 420C and 415C, respectively, and the control signals $EN_3$ and $BS_1$ are asserted to close the switches 420D and 415A, respectively. At around a time t=$t_7$>$t_6$, the control signal $SEL_2$ is deasserted to open the switch 425B and the control signal $SEL_3$ is asserted to close the switch 425C. With the switch 425B open and the switch 425C closed, the detector 405C can be read out. In this regard, the detector 405C provides a signal (e.g., current flowing through the switch 425C, the detector 405C, and the switch 420D) to circuitry of the ROIC. The detector 405B, with the switch 415B open, functions to isolate the detector 405C from a potential short at the node 430 and/or the contact 410A.

In a similar manner, other detectors, including the detector 405D, may be selected for readout, for example, row by row in a sequential fashion. In this regard, at around a time $t_8$, the detector 405D has been read out and the control signals are deasserted and asserted as appropriate. As such, in FIG. 5, the frame period may be of a duration of around $t_8$. After t=$t_8$ (e.g., after performing readout of the detectors 405A through 405D, including any detectors between the detectors 405C and 405D not explicitly shown in FIG. 4), the detector array and the selection circuit may be initialized for a next frame period. The control signals $EN_0$ through $EN_N$ are reasserted (e.g., as part of a global EN signal turn on), while the control signals $SEL_1$ through $SEL_N$ are in a deasserted state and the control signals $BS_1$ through $BS_N$ are in an asserted state, and thus the timing diagram 500 may be repeated for a next reading (e.g., a next frame) of the detector array. In some embodiments, by closing the switches 415A-D, 420A-F, and 425A-E in this manner, the detrimental parasitic resistance and capacitance characteristics may be minimized and potential defects may be isolated, thus providing improved detector array performance.

In FIG. 5, there are brief non-overlap times when two detectors are enabled. For example, a non-overlap time between the deassertion of the control signal $EN_1$ and the assertion of the control signal $SEL_2$ results in a brief time when both the detectors 405A and 405B are enabled (e.g., current flowing through the switch 425A, the detectors 405A and 405B, and the switch 420C). Similarly, such a non-overlap time is present between the deassertion of the control signal $EN_2$ and the subsequent assertion of the control signal $SEL_3$, between the deassertion of the control signal $EN_3$ and the subsequent assertion of the control signal $SEL_4$, between the deassertion of the control signal $EN_{N-1}$ and the subsequent assertion of the control signal $SEL_N$, and so forth. It is noted that FIG. 5 illustrates a timing diagram associated with one example implementation, and that other implementations might not include a time duration when two detectors are enabled.

In an aspect, specific switching schemes (e.g., timing of on or off state of each switch) associated with the selection circuit of the circuit 400 shown in FIG. 4 and the timing diagram 500 shown in FIG. 5 may facilitate reduced sensitivity to defects (e.g., column-to-column short defect), less noise, less crosstalk, and/or reduced parasitic capacitance within the FPA. In some cases, a previously read out detector and its associated portion of the selection circuit may be used to isolate a detector that currently being read out.

Figure 6:
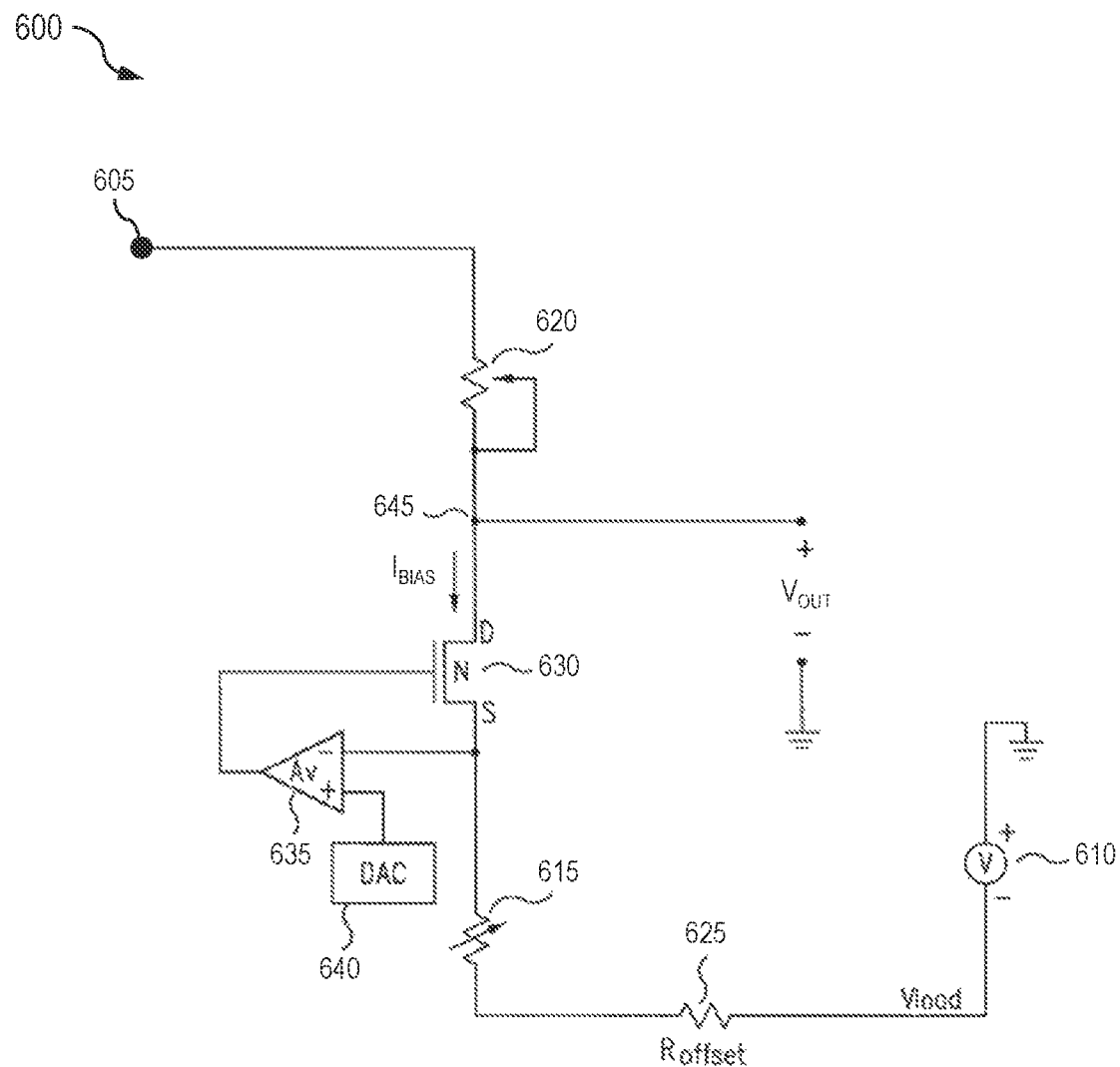
FIG. 6 illustrates a circuit associated with a readout circuit in accordance with one or more embodiments of the present disclosure.

FIG. 6 illustrates a circuit 600 associated with a readout circuit (e.g., ROIC) in accordance with one or more embodiments. In an embodiment, the circuit 600 is coupled to the selection circuit and the detector array that includes the detector string 405 of FIG. 4, and the detector array is a microbolometer array. In this regard, a node 605 may be connected to the node 435 of FIG. 4. In some cases, the circuit 600 provides temperature compensation for the detector array. It is noted that, in other embodiments and as would be understood by one skilled in the art, the circuit 600 may be associated with readout of other detector arrays, and/or a different circuit from the circuit 600 may be associated with readout of other detector arrays. For explanatory purposes, the detector array is a microbolometer array. However, the detector array may include other types of infrared detector arrays (e.g., thermal infrared detector arrays, infrared detector arrays outside of the thermal infrared spectrum) or detector arrays associated with wavelengths outside of the infrared spectrum.

The circuit 600 includes a supply voltage 610, a thermally-shorted microbolometer 615, resistors 620 and 625, a transistor 630, an amplifier 635, and a DAC 640. The supply voltage 610 may provide the reference voltage $V_{DETCOM}$. In some aspects, the circuit 600 provides substrate temperature compensation and temperature coefficient of resistance (TCR) mismatch compensation for the detector array.

An active microbolometer (e.g., one of the detectors 405A-D or other detector) of the microbolometer array may be a thermally-isolated microbolometer, selected from the circuit 400 as provided above, that receives incident infrared radiation. The active microbolometer is biased by the reference voltage $V_{DETCOM}$ and a load current $I_{BIAS}$. The amplifier 635 provides a gate bias to the transistor 630, while the DAC 640 is used to set an amplifier reference voltage and control the amplifier 635 to set the appropriate gate bias for the transistor 630. Alternatively, the amplifier 635 can be eliminated and the DAC 640 used to set the appropriate gate bias directly for the transistor 630. A load circuit or bias circuit includes the supply voltage 610, the resistor 625, the microbolometer 615 (e.g., thermally shorted (to the substrate) load microbolometer), the transistor 630, and the amplifier 635 with the DAC 640, which are used to establish the load current $I_{BIAS}$.

The microbolometer 615 is used as a substrate temperature compensated load. The supply voltage 610 is set to optimize an operating point for the circuit 600 by setting a nominal voltage drop across the microbolometer 615. An output voltage $V_{OUT}$ of the circuit 600 is provided at a node 645. In some cases, the output voltage $V_{OUT}$ may be translated, amplified, or converted by amplification or integration processes and/or other signal processing techniques. For example, an amplifier may amplify a voltage at the node 645 to provide the output voltage $V_{OUT}$.

As incident infrared radiation levels increase, the temperature of the active microbolometer (e.g., one of the detectors of the detector string 405) increases. The temperature increase lowers the active microbolometer's resistance and reduces the voltage drop across the active microbolometer, and thus increases the voltage level at the drain terminal of the transistor 630 (i.e., at the node 645). The change in the voltage drop across the active microbolometer causes a change in the output voltage $V_{OUT}$. As such, an increase or a decrease in incident infrared radiation levels is reflected by an increase or a decrease, respectively, in the voltage level of the output voltage $V_{OUT}$.

The supply voltage 610 is used to adjust the load current and thereby optimize the operating point of the circuit 600 by setting the output voltage $V_{OUT}$ at a desired point within a range of output circuitry voltage levels. By setting the appropriate gate bias of the transistor 630 and appropriate voltage level of the supply voltage 610, the output voltage $V_{OUT}$ is adjusted. For example, the supply voltage 610 may be a single voltage level set for the entire array of microbolometers. The amplifier 635 and the DAC 640 may then be used to supply a unique voltage bias to each corresponding thermally-shorted microbolometer 615 in the FPA to provide a fine adjustment or offset to the load voltage or the load current $I_{BIAS}$. This corrects for the individual offset errors in the output signals from each of the thermally-isolated microbolometers (e.g., the active microbolometers). By adjusting the offset for each microbolometer circuit, the nominal output voltage level of the output voltage $V_{OUT}$ for each circuit is adjusted to fall within a desired range.

In an aspect, the resistors 620 and 625 may be used to address a relative mismatch in the TCR between the active microbolometer and the microbolometer 615 (e.g., the load microbolometer). The resistor 620 is a variable resistor to provide adjustments (e.g., fine adjustments) to the composite TCR value of the active microbolometer portion of the circuit relative to the load microbolometer portion of the circuit. The resistor 625 provides an adjustment (e.g., coarse adjustment) for the circuit 600. Thus, by setting the resistor 620, temperature compensation may be provided for the mismatch in relative TCR between the active microbolometer and the load microbolometer. In this regard, for the voltage divider network of resistors, the resistor 620 adjusts the composite TCR of the active microbolometer and the resistor 620 relative to the microbolometer 615 and the resistor 625. As an example, circuit values for these circuit elements may be in the range of around 50 kΩ to around 200 kΩ and around 150 kΩ to around 600 kΩ for the active microbolometer and the microbolometer 615, respectively. Example circuit values for the resistors 620 and 625 may, for example, vary within around 0Ω to around 10 kΩ and vary within around 0Ω to around 30 kΩ, respectively, but these ranges are not limiting and may vary over wider ranges of values.

The resistors 620 and 625 are typically resistors having a different TCR (e.g., generally lower) than their corresponding microbolometers (e.g., the active microbolometer and the microbolometer 615). For example, the resistor 620 may have a low TCR and the active microbolometer may have a higher TCR relative to the microbolometer 615. By the proper selection of the resistance value of the resistor 620, the combination of the resistor 620 and the active microbolometer provides a TCR that is closer to the TCR of the microbolometer 615 (or the TCR of the combination of the microbolometer 615 and the resistor 625 if the resistor 625 is present) than is the TCR of solely the active microbolometer. Therefore, the performance and behavior of each microbolometer within the array is vastly improved over a range of substrate temperatures.

While FIGS. 4-6 illustrate portions of circuitry an FPA and a timing diagram associated with readout of the FPA's detector array, it is noted that such circuitry and timing diagram are provided by way of non-limiting example. Different architectures (and associated timing diagram) can be utilized to implement the circuitry of the FPA, such as different architectures of the detector array, the selection circuit of the readout circuit, and/or other components of the FPA. Additional examples of circuitry of the FPA and associated timing diagrams are provided for example in U.S. Pat. No. 7,679,048, which is incorporated herein by reference in its entirety.

In some embodiments, techniques for verifying unit cell selection functionality are provided. In some aspects, a unit cell array includes a detector array and a selection circuit for selecting one or more detectors of the detector array. Each unit cell of the unit cell array includes a detector and a portion of the selection circuit. The selection circuit may include switches whose state (e.g., on state or off state) may be controlled using control signals to select/address portions of the detector array, such as address/select detectors for readout on a row-by-row basis. As such, techniques provided herein to verify the functionality of the selection circuit may involve verifying functionality of each of the switches that form the selection circuit.

During a normal operation of the unit cell array, a combination of states for the switches for a portion of the unit cells (e.g., a row of the unit cells) being addressed is controlled (e.g., turned on or off) according to a particular signal pattern sequence for readout compared to non-addressed unit cells. Normal operation may refer to detection of radiation to generate detection signals followed by readout of these detection signals, without unit cell selection verification as provided herein. This particular signal pattern sequence may be referred to as a normal signal pattern sequence, since the signal pattern sequence is followed to address the unit cells for readout during a normal operation. For example, with reference back to FIGS. 4 and 5, at a given point in time, the state (e.g., logic high or logic low) of the BS, EN, and SEL control signals are in a particular signal pattern (e.g., particular combination of logic high and logic low) to facilitate biasing and readout of the addressed unit cells compared to the state of these signals in non-addressed unit cells. In the example of FIGS. 4 and 5, a signal pattern applied to a unit cell may be provided as a 3-tuple (BS, EN, SEL). For instance, a signal pattern applied to the switches 415B, 420C, and 425B associated with the detector 405B in FIG. 4 may be provided by the 3-tuple ($BS_2$, $EN_2$, $SEL_2$). It is noted that while, for explanatory purposes, unit cell selection is performed using three control signals, in other embodiments unit cell selection may be performed using fewer than three control signals or more than three control signals. The number of control signals is generally based on an architecture of the detector array and/or the readout circuit.

To verify functionality of unit cell selection circuitry, control signals provided via control lines (e.g., digital control lines) to the selection circuit (e.g., each switch of the selection circuit) can be controlled (e.g., set) and an output signal from the unit cells can be monitored. For example, in FIG. 2, control signals may be provided by the row multiplexer 230 to the row 270 of the unit cell array 205 via the control line(s) 265. In an embodiment, the techniques may test (e.g., directly test) and verify functionality of each of the switches of the selection circuit, which in some cases cover a large percentage of chip area and of the total switch count associated with the readout circuit. In an aspect, the switches may be implemented using transistors. Such transistors may be referred to as imaging sensor unit cell transistors, unit cell interface transistors, or unit cell transistors. As examples, a switch that is not functioning properly may exhibit characteristics of being stuck in the on state (e.g., the switch essentially functions as a short) or stuck in the off state (e.g., the switch essentially functions as an open).

In some embodiments, for each frame, a predetermined signal pattern may be applied to a portion of the selection circuit (e.g., associated with a row of the detector array). A predetermined signal pattern may refer to a state (e.g., logic low or logic high) of each control signal to be applied to the portion of the selection circuit. In some aspects, for the portion of the selection circuit that is being tested, the predetermined signal pattern may be applied to the portion of the selection circuit for a single frame period (e.g., an entire frame period). For example, applying a logic high or a logic low to a switch simulates the situation in which the switch is stuck in the on state or off state, respectively. Other portions (e.g., portions not currently being tested) of the selection circuit are addressed normally, in which a normal signal pattern sequence is applied for readout of these other portions. In this regard, the portion of the selection circuit being tested may be associated with a verification operation, whereas the remaining portions of the selection circuit may be associated with a normal operation. In some aspects, a set of predetermined signal patterns may be applied to the portion of the selection circuit to verify whether this portion of the selection circuit (e.g., the switches of this selection circuit portion) is operating properly, before proceeding to verify other portions of the selection circuit (e.g., the switches of other selection circuit portions).

In one aspect, with three control signals BS, EN, and SEL, each portion of the selection circuit may be tested using the same 8 (i.e., $2^3$) combinations of states for these control signals. Table 1 illustrates an example of predetermined signal patterns applied row-by-row to a unit cell array having 2,160 rows to verify functionality of each of the three switches associated with each row of the unit cell array. For each frame, a predetermined signal pattern is applied to one row of unit cells. To apply the eight predetermined signal patterns to each row of the unit cell array, 17,280 frames are captured by the unit cell array. In this regard, a test of the selection circuit of the 2,160 row unit cell array spans 17,280 frame periods. Other rows of unit cells are addressed normally, in which a normal signal pattern sequence is applied for readout of these other rows.

TABLE 1

Example of sequence of predetermined signal patterns applied

| Frame | Row Tested | Predetermined Signal Pattern # (BS, EN, SEL) |
|---|---|---|
| 1 | 1 | 0: 0, 0, 0 |
| 2 | 1 | 1: 0, 0, 1 |
| 3 | 1 | 2: 0, 1, 0 |
| 4 | 1 | 3: 0, 1, 1 |
| 5 | 1 | 4: 1, 0, 0 |
| 6 | 1 | 5: 1, 0, 1 |
| 7 | 1 | 6: 1, 1, 0 |
| 8 | 1 | 7: 1, 1, 1 |
| 9 | 2 | 0: 0, 0, 0 |
| 10 | 2 | 1: 0, 0, 1 |
| 11 | 2 | 2: 0, 1, 0 |
| 12 | 2 | 3: 0, 1, 1 |
| 13 | 2 | 4: 1, 0, 0 |
| 14 | 2 | 5: 1, 0, 1 |
| 15 | 2 | 6: 1, 1, 0 |
| 16 | 2 | 7: 1, 1, 1 |
| 17 | 3 | 0: 0, 0, 0 |
| 18 | 3 | 1: 0, 0, 1 |
| . | . | . |
| . | . | . |
| . | . | . |
| 17271 | 2159 | 6: 1, 1, 0 |
| 17272 | 2159 | 7: 1, 1, 1 |
| 17273 | 2160 | 0: 0, 0, 0 |
| 17274 | 2160 | 1: 0, 0, 1 |
| 17275 | 2160 | 2: 0, 1, 0 |
| 17276 | 2160 | 3: 0, 1, 1 |
| 17277 | 2160 | 4: 1, 0, 0 |
| 17278 | 2160 | 5: 1, 0, 1 |
| 17279 | 2160 | 6: 1, 1, 0 |
| 17280 | 2160 | 7: 1, 1, 1 |

As an example from Table 1, for frame 1, row 1 of the unit cell array has the predetermined signal pattern #0 (BS=0, EN=0, SEL=0) applied. As other examples in Table 1, for frames 2 through 8, row 1 of the unit cell array has the predetermined signal patterns #2 ($BS_1$=0, $EN_1$=0, $SEL_1$=1)

through predetermined signal patterns #7 ($BS_1=1$, $EN_1=1$, $SEL_1=1$) applied. Each of subsequent frames 9 through 17,280 may be associated with application of one of the eight predetermined signal patterns for a given row of the unit cell array.

With reference to row 1 of the unit cell array, row 1 may include the detector 405A and other detectors in the same row as the detector 405A. For frame 1, by applying predetermined signal pattern #0 to the portion of the selection circuit associated with row 1 of the unit cell array, row 1 of the unit cell array is expected to provide no signal (e.g., a nominally zero output). In this regard, for the detector 405A in row 1, the control signals $BS_1$, $EN_1$, and $SEL_1$ are at logic low and the switches 415A, 420B, and 425A are off. Similarly, other detectors in row 1 also receive these control signals and their corresponding switches are in the off state. If a unit cell of row 1 provides a non-zero signal instead of the expected nominally zero signal, the unit cell may be determined not to be functioning properly/correctly. The remaining predetermined signal patterns (e.g., predetermined signal patterns #1 through #7) may be applied to the unit cells of row 1 in successive frames (e.g., frames 2 through 8) to further verify functionality of the unit cells of row 1. Application of each of the predetermined signal patterns on a given row of the unit cells may allow verification of functionality of each unit cell (e.g., each switch of each unit cell) of the row. In this regard, functionality of each individual switch may be verified.

A unit cell determined not to be functioning properly/correctly may be indicated as being in an error state. An error state may be due to a bad connection (e.g., a control line carrying the control signal to a switch may be faulty) and/or one or more of the switches may be always stuck on (e.g., the switches essentially always remain a short) or stuck off (e.g., the switches essentially always remain an open). In the example above, troubleshooting and/or mitigating actions (e.g., fixes) can be performed on row 1 of the unit cell (or specific portions/components of row 1 of the unit cell) if any switches are determined not to be operating properly.

In another aspect, rather than applying all predetermined signal patterns in consecutive frames to the portion of the selection circuit associated with a given row of the detection array, the same predetermined signal pattern may be applied in consecutive frames to portions of the selection circuit associated with different rows. Table 2 illustrates an example of predetermined signal patterns applied using such a scheme to verify, row-by-row, functionality of each of the three switches associated with each row of the unit cell array. Other rows are addressed normally.

TABLE 2

Example of sequence of predetermined signal patterns applied

| Frame | Row Tested | Predetermined Signal Pattern (BS, EN, SEL) |
|---|---|---|
| 1 | 1 | 0: 0, 0, 0 |
| 2 | 2 | 0: 0, 0, 0 |
| 3 | 3 | 0: 0, 0, 0 |
| 4 | 4 | 0: 0, 0, 0 |
| . | . | . |
| . | . | . |
| . | . | . |
| 2158 | 2158 | 0: 0, 0, 0 |
| 2159 | 2159 | 0: 0, 0, 0 |
| 2160 | 2160 | 0: 0, 0, 0 |
| 2161 | 1 | 1: 0, 0, 1 |
| 2162 | 2 | 1: 0, 0, 1 |

TABLE 2-continued

Example of sequence of predetermined signal patterns applied

| Frame | Row Tested | Predetermined Signal Pattern (BS, EN, SEL) |
|---|---|---|
| 2163 | 3 | 1: 0, 0, 1 |
| 2164 | 4 | 1: 0, 0, 1 |
| . | . | . |
| . | . | . |
| . | . | . |
| 4318 | 2158 | 1: 0, 0, 1 |
| 4319 | 2159 | 1: 0, 0, 1 |
| 4320 | 2160 | 1: 0, 0, 1 |
| . | . | . |
| . | . | . |
| . | . | . |
| 15121 | 1 | 7: 1, 1, 1 |
| 15122 | 2 | 7: 1, 1, 1 |
| 15123 | 3 | 7: 1, 1, 1 |
| 15124 | 4 | 7: 1, 1, 1 |
| . | . | . |
| . | . | . |
| . | . | . |
| 17278 | 2158 | 7: 1, 1, 1 |
| 17279 | 2159 | 7: 1, 1, 1 |
| 17280 | 2160 | 7: 1, 1, 1 |

It is noted that Tables 1 and 2 provide example schemes for verifying unit cell selection functionality, and that other schemes may be used to verify selection functionality so long as functionality of each switch (e.g., each transistor) of the selection circuit is verified. In some cases, a scheme may cause testing to be performed on two different rows in two temporally adjacent frames (e.g., in Tables 1 and 2, frames 3 and 4 are temporally adjacent frames). In still other cases, a scheme may define a minimum distance between rows that can be tested in temporally adjacent frames. For example, if frame 1 is associated with testing row 1, frame 2 may need to be associated with testing row 1,080 or beyond. The scheme utilized may be based on application. For example, testing row 1 for eight consecutive frames (e.g., little or no image data is provided by row 1 for eight consecutive frames) may be undesirable in some applications.

In some aspects, such as when obtaining test data from the selection circuit is too disruptive for imaging and/or at odds with a fault tolerant time interval associated with some applications, the unit cell selection verification may be performed as a power-on test. Alternatively or in addition, the schemes for performing unit cell selection verification, such as those shown in Tables 1 and 2, may be designed to avoid the test data interfering with imaging and/or other application dependent criteria. For example, in some cases, avoiding testing of the same row in temporally adjacent frames may help with avoiding disruption to imaging.

As one example, for an FPA with 2,160 rows and operating at a frame rate of 240 Hz, a time to perform unit cell selection verification according to Table 1 or Table 2 is 72 seconds. As another example, for an FPA with 2,160 rows and operating at a frame rate of 60 Hz, a time to perform unit cell selection verification according to Table 1 or Table 2 is 288 seconds.

Figure 7:
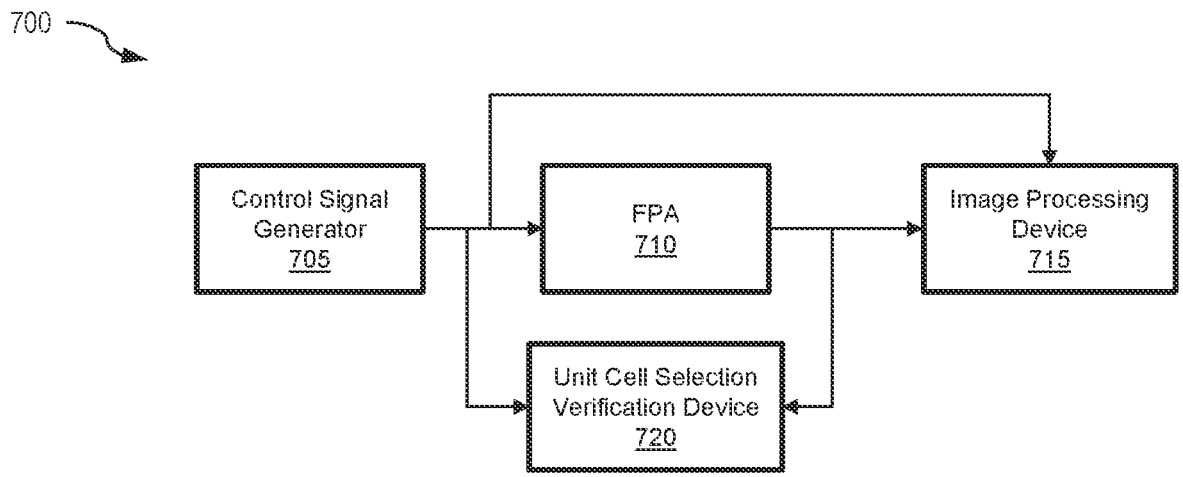
FIG. 7 illustrates an example system for facilitating functionality verification of unit cell selection in accordance with one or more embodiments of the present disclosure.

FIG. 7 illustrates an example system 700 for facilitating functionality verification of unit cell selection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 700 includes a control signal generator 705, an FPA 710, an image processing device 715, and a unit cell selection verification device 720 (e.g., also referred to simply as a selection verification device or a verification device). The FPA 710 includes a detector array and an ROIC. In an embodiment, the control signal generator 705 and the unit cell selection verification device 720 may be implemented by the processing component 105 and/or the imaging capture component 115.

The control signal generator 705 may generate control signals for the FPA 710. The control signals may include control signals for selecting/addressing unit cells of the FPA 710 (e.g., for readout). In an aspect, for a given subset (e.g., row) of unit cells, the control signal generator 705 may apply a set of predetermined signal patterns to the subset of unit cells to verify functionality of the subset of unit cells. In some cases, for a given frame, the control signal generator 705 may apply a predetermined signal pattern to one subset of unit cells to verify functionality of this subset of unit cells. In one example, such as with regard to Table 1, the control signal generator 705 may apply each predetermined signal pattern of the set of predetermined signal patterns to the same row of unit cells across temporally adjacent frames, before proceeding to apply each predetermined signal pattern of the set of predetermined signal patterns to a next row of unit cells across temporally adjacent frames. In another example, such as with regard to Table 2, the control signal generator 705 may apply the same predetermined signal pattern to each row of unit cells across temporally adjacent frames, before proceeding to apply the next predetermined signal pattern to each row across temporally adjacent frames. Other manners by which the set of predetermined signal patterns may be applied to verify functionality of the unit cells of the unit cell array may be performed dependent on application.

The image processing device 715 may generate an image based on output signals from the FPA 710. For the unit cells not currently tested (e.g., normal signal pattern sequence applied), the output signals may be based on the detection signals (e.g., detection current/voltage) generated by the detectors of these unit cells based on detected radiation (e.g., detected IR radiation). For the unit cells that are tested, dependent on the predetermined signal pattern applied, the output signals from these unit cells may or may not be dependent on the detection signals generated by detectors of these unit cells. In an aspect, the output signals that are not dependent on the detection signals may still be considered as being associated with the detectors (or more generally associated with the unit cells that include these detectors), since the output signals are obtained when the ROIC is addressed to read out from the detectors. In one case, the image processing device 715 may include the output signals from the tested unit cells in the image, which may be provided for display, storage, and/or further processing. In such a case, a portion of the image provided by the image processing device 715 may not be related to image data. Dependent on the number of rows and columns in the unit cell array, a portion of the image associated with the tested unit cells is generally not noticeable by a viewer of the image. For example, when the tested unit cells make up one row of an array having hundreds or thousands of rows, the viewer may generally not notice that one of the rows does not include image data.

In other cases, the image processing device 715 does not incorporate the output signals from the tested unit cells in the generated image. As one example, for a unit cell array having 2,160 rows, the image generated by the image processing device 715 may simply exclude the output signals associated with the tested unit cells from the image (e.g., not include these output signals in the image), such that the image effectively has 2,159 rows of image data. As another example, the image processing device 715 may generate pixel values for the tested unit cells based on the output signals (e.g., the detection signals) of one or more of the non-tested unit cells, and generate the image based on the output signals of the non-tested unit cells and these generated pixel values. Such pixel values may be referred to as interpolated pixel values. The non-tested unit cells whose detection signals are used to generate the pixel values may be unit cells that neighbor the tested unit cells. As one example, these unit cells may spatially neighbor the tested unit cells, such as unit cells in adjacent rows of the tested unit cells (e.g., when testing is performed row-by-row). Alternatively or in addition, as another example, these unit cells may be temporal neighbors of the tested unit cells. For instance, consider that row 86 of the unit cell array is tested in frame 74 and is not tested in frames 72, 73, 75, and 76. For frame 74, pixel values for row 86 may be determined based on the detection signals from row 86 for one or more of frames 72, 73, 75, and 76. Other manners by which to generate an image when a subset of unit cells is being tested may be utilized and may be based on application (e.g., whether the application is sensitive to missing/losing a row of image data).

The unit cell selection verification device 720 may receive output signals from the FPA 710. In some cases, the unit cell selection verification device 720 may receive output signals from all the unit cells of the FPA 710. In other cases, the unit cell selection verification device 720 may receive output signals only from the unit cells of the FPA 710 to be verified (e.g., output signals only from the tested unit cells).

The unit cell selection verification device 720 may determine whether the tested unit cells operated properly in response to the applied predetermined signal pattern. For example, with reference to Table 1, for frame 9, the unit cell selection verification device 720 determines whether row 2 of the FPA 710 is operating properly by determining whether no signal (e.g., a nominally zero signal) is received from the each unit cell of row 2 in response to the predetermined signal pattern (BS=0, EN=0, SEL=0) applied to row 2 of the FPA 710. For frame 15, the unit cell selection verification device 720 determines whether row 2 of the FPA 710 is operating properly based on whether the output signals associated with row 2 of the FPA 710 match output signals expected in response to the predetermined signal pattern (BS=1, EN=1, SEL=0) applied to row 2 of the FPA 710. In this regard, the unit cell selection verification device 720 may verify functionality of row 2 by comparing the output signals of row 2 to output signals expected in response to application of a predetermined signal pattern. With further reference to row 2, the unit cell selection verification device 720 may use at least frames 9 through 16 collectively to determine whether row 2 of the FPA 710 is operating properly. In an aspect, the output signals associated with the portion of the selection circuit may be captured in an output stream and compared to factory characterized safe operating range predicted results to verify functionality of the portion of the selection circuit.

Knowledge of the predetermined signal pattern applied (e.g., for a given frame) facilitates image generation by the image processing device 715 and unit cell selection verification by the unit cell selection verification device 720. In some embodiment, the image processing device 715 and/or the unit cell selection verification device 720 may receive an indication from the control signal generator 705 of the predetermined signal pattern applied to the FPA 710 for a given frame. In other embodiments, the control signal generator 705 may not need to communicate an indication of the predetermined signal pattern to the unit cell selection verification device 720. For example, appropriate synchronization and operation of the control signal generator 705 and the unit cell selection verification device 720 with regard to, for example, frame number and associated predetermined signal pattern applied to this frame number may avoid the need to communicate, by the control signal generator 705, an indication of the predetermined signal pattern to the image processing device 715 and/or the unit cell selection verification device 720.

In some aspects, verification of unit cell selection functionality may be aborted without all predetermined signal patterns having been applied to all portions of the selection circuit. As one example, the verification may be aborted when greater than a threshold number of portions and/or switches of the selection circuit in the FPA 710 as a whole are determined not to be operating properly. As another example, the verification may be aborted when greater than a threshold number of portions and/or switches in a localized area of the FPA 710 are determined not to be operating properly. In this latter example, a high density of the selection circuit not operating properly in a localized area may be indicative of damage to the FPA 710 in that localized area. In some cases, a user of the FPA 710 (e.g., a camera including the FPA 710) may be alerted of the situation, such that the user may troubleshoot and/or perform mitigation actions (e.g., clean the localized area as a possible fix).

Figure 8:
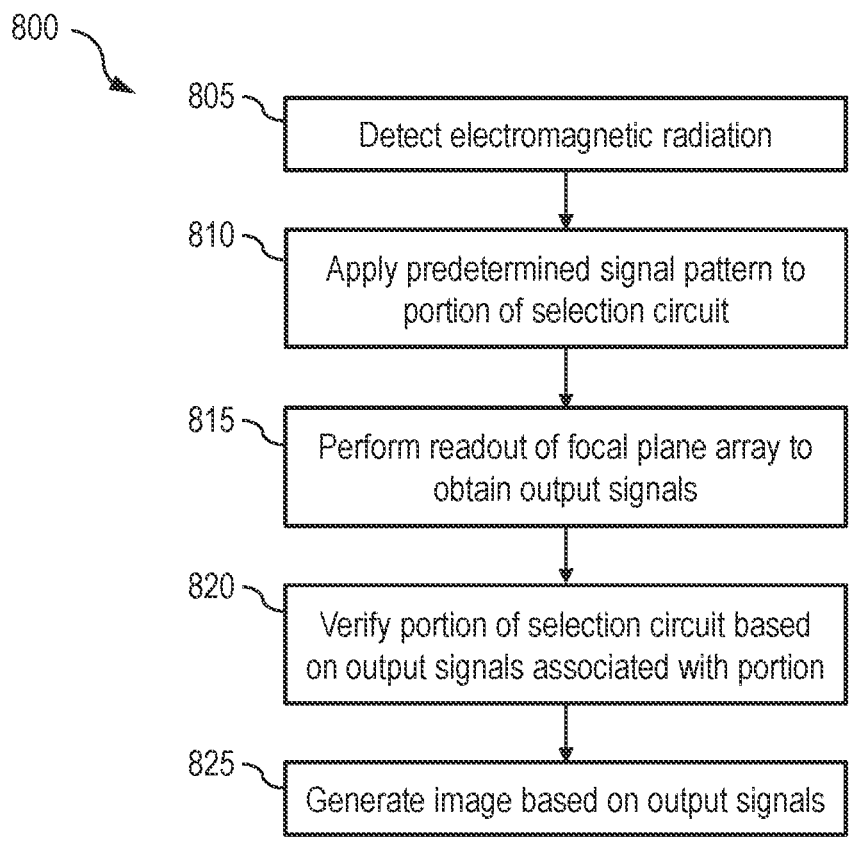
FIG. 8 illustrates a flow diagram of an example process for facilitating functionality verification of unit cell selection in accordance with one or more embodiments of the present disclosure.

FIG. 8 illustrates a flow diagram of an example process 800 for facilitating functionality verification of unit cell selection in accordance with one or more embodiments of the present disclosure with one or more embodiments of the present disclosure. For explanatory purposes, the process 800 is primarily described herein with reference to the system 700 of FIG. 7. However, the process 800 can be performed in relation to other systems for facilitating functionality verification of unit cell selection. Note that one or more operations in FIG. 8 may be combined, omitted, and/or performed in a different order as desired.

At block 805, the detector array of the FPA 710 detects electromagnetic radiation. In an aspect, the detector array is an infrared detector array (e.g., microbolometer array) that detects IR radiation (e.g., thermal IR radiation).

At block 810, the control signal generator 705 applies a predetermined signal pattern to a portion of a selection circuit of the FPA 710. In an embodiment, the portion of the selection circuit may include a portion associated with a row of the detector array (e.g., associated with addressing/readout of a row of the detector array). With reference to FIGS. 4 and 5, the predetermined signal pattern may be provided as a 3-tuple (BS, EN, and SEL). Each of these three control signals are applied to corresponding switches to configure these switches into an on or off state. For example, for frame 1 of Table 1 and with reference to FIGS. 4 and 5, the predetermined signal pattern ($BS_1=0$, $EN_1=0$, $SEL_1=0$) is applied to the detector 405A and other detectors in the same row as the detector 405A. The switches 415A, 420B, and 425A associated with the detector 405A are open in response to the predetermined signal pattern ($BS_1=0$, $EN_1=0$, $SEL_1=0$).

At block 815, the readout circuit of the FPA 710 performs a readout of the FPA 710 to obtain output signals. While the portion of the selection circuit has the predetermined signal pattern applied, the remaining portions (e.g., remaining rows) of the selection circuit are controlled normally (e.g., addressed normally via a normal signal pattern sequence) to allow readout of detection signals generated by the detectors associated with these remaining portions. For a given detector, the detection signal (e.g., detection voltages, detection currents) may be generated based on the electromagnetic radiation detected by this detection. Depending on the predetermined signal pattern applied, the output signals associated with the portion of the selection circuit may be independent of the electromagnetic radiation detected by the detectors associated with the portion of the selection circuit. For the remaining portions of the selection circuit, the output signals may be, or may be based on, the detection signals generated by the associated detectors.

At block 820, the unit cell selection verification device 720 determines/verifies whether the portion of the selection circuit is operating properly based on the output signals associated with the portion of the selection circuit. The unit cell selection verification device 720 may compare the output signals with expected output signals corresponding to the predetermined signal pattern applied at block 815. For example, no signal (e.g., nominally zero signal) is expected from the portion of the selection circuit when the predetermined signal pattern (BS=0, EN=0, SEL=0) is applied to the portion of the selection circuit. In some cases, the output signals associated with the portion of the selection circuit may be captured in an output stream and compared to factory characterized safe operating range predicted results. It is noted that such verification at block 820 may be referred to as a partial verification of the portion of the selection circuit. In this regard, the unit cell selection verification device 720 may verify/determine whether a given portion of the selection circuit is operating properly based on output signals obtained from the portion in response to application of each of a set of predetermined signal patterns, such as shown for example in Tables 1 and 2.

At block 825, the image processing device 715 generates an image based on output signals from the FPA 710. The image may be provided for display, storage, and/or further processing. In one case, the image processing device 715 may include the output signals associated with the portion of the selection circuit. In such a case, a portion of the image provided by the image processing device 715 may not be related to image data. In other cases, the image processing device 715 does not incorporate the output signals associated with the portion of the selection circuit in the generated image.

In some embodiments, the process 800 is performed during a single frame period. A next frame period may be associated with applying a different predetermined signal pattern to the same portion of the selection circuit (e.g., as in the scheme shown in Table 1), the same predetermined signal pattern to a different portion of the selection circuit (e.g., as in the scheme shown in Table 2), or a different predetermined signal pattern to a different portion of the selection circuit. In some aspects, the process 800 may be repeatedly performed until all predetermined signal patterns have been applied to all portions of the selection circuit (e.g., all transistors of the selection circuit). In some aspects, verification of unit cell selection functionality may be aborted without all predetermined signal patterns having been applied to all portions of the selection circuit, such as if a large number of switches of the selection circuit is determined not to function properly.

Using various embodiments, techniques may be applied to implement a safety measure to support functional safety for imagers (e.g., infrared cameras). In some aspects, large portions of selection circuitry of an FPA may have their functionality rapidly tested. In some cases, the safety measure may verify unit cell selection circuitry (e.g., unit cell switches) is functioning properly. As such, such techniques may allow each unit cell switch to be tested (e.g., directly tested) and allow for a direct claim of functionality safety coverage, such as a direct claim involved to certify compliance with safety standards. For instance, such techniques may facilitate reduction of time and documentation involved to certify compliance with safety standards (e.g., vehicle safety standards). In some aspects, such as when obtaining test data from the selection circuit is too disruptive for imaging and/or at odds with a fault tolerant time interval associated with some applications (e.g., vehicle applications), the unit cell selection verification may be performed as a power-on test. For example, for a vehicle application, a camera mounted to a vehicle may have its selection circuitry tested during power-on of the vehicle and/or the camera.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
    detecting, by each detector of a focal plane array, electromagnetic radiation, wherein each detector is selectively coupled to a readout circuit of the focal plane array via a selection circuit of the focal plane array;
    during a first frame period:
        applying a first predetermined signal pattern to a first portion of the selection circuit, wherein the first portion of the selection circuit is associated with a first subset of detectors of the focal plane array; and
        performing a first readout of the focal plane array to obtain a respective output signal associated with each respective detector of the focal plane array;
    determining whether the first portion of the selection circuit is operating properly based at least on the output signal associated with the detectors of the first subset from the first readout; and
    generating an image based at least on the output signals of the detectors of the focal plane array not among the first subset of detectors.

2. The method of claim 1, wherein the first predetermined signal pattern is one of a plurality of predetermined signal patterns, and wherein the output signal of each detector among the first subset in response to at least one of the plurality of predetermined signal patterns is independent of the electromagnetic radiation.

3. The method of claim 2, wherein the determining is based on the output signal of the detectors of the first subset in response to each of the plurality of predetermined signal patterns.

4. The method of claim 1, wherein the focal plane array comprises a unit cell array, wherein each unit cell of the unit cell array comprises a detector of the focal plane array and a portion of the selection circuit, wherein the portion comprises a plurality of switches, and wherein the first subset of detectors comprises a row of detectors.

5. The method of claim 1, further comprising, during a second frame period:
    applying a second predetermined signal pattern to the first portion of the selection circuit; and
    performing a second readout of the focal plane array to obtain a respective output signal associated with each respective detector of the focal plane array,
    wherein the determining is based at least on the output signals associated with the detectors of the first subset from the first and second readouts.

6. The method of claim 5, wherein the second frame period is temporally adjacent to the first frame period.

7. The method of claim 5, wherein the second frame period is not temporally adjacent to the first frame period.

8. The method of claim 1, further comprising, during a second frame period:
    applying a second predetermined signal pattern to a second portion of the selection circuit, wherein the second portion of the selection circuit is associated with a second subset of detectors of the focal plane array;
    performing a second readout of the focal plane array to obtain a respective output signal associated with each respective detector of the focal plane array; and
    determining whether the second portion of the selection circuit is operating properly based at least on the output signals associated with the detectors of the second subset from the second readout, and wherein the second frame period is temporally adjacent to the first frame period.

9. The method of claim 1, further comprising determining pixel values for the first subset of detectors based on the output signal of one or more of the detectors not among the first subset of detectors, wherein the image is based on the pixel values and the output signals of the detectors not among the first subset of detectors.

10. The method of claim 9, wherein the one or more of the detectors comprise one or more detectors neighboring one or more detectors of the first subset of detectors.

11. The method of claim 1, further comprising, during the first frame period:
    configuring a first plurality of switches to selectively short one or more of the detectors of the focal plane array;

configuring a second plurality of switches to selectively provide a bias signal to one or more of the detectors of the focal plane array; and configuring a third plurality of switches to selectively couple one or more of the detectors of the focal plane array to the readout circuit.

12. The method of claim 11, wherein:

the first predetermined signal pattern comprises a first signal level associated with a first control signal, a second signal level associated with a second control signal, and a third signal level associated with a third control signal;

the configuring the first plurality of switches comprises configuring a first set of switches associated with the first subset of detectors using the first control signal;

the configuring the second plurality of switches comprises configuring a second set of switches associated with the first subset of detectors using the second control signal; and the configuring the third plurality of switches comprises configuring a third set of switches associated with the first subset of detectors using the third control signal.

13. The method of claim 11, wherein each switch of the first plurality of switches, each switch of the second plurality of switches, and each switch of the third plurality of switches comprises a transistor.

14. An imaging device comprising:

a focal plane array comprising:
  a detector array comprising a plurality of detectors, wherein each detector is configured to detect electromagnetic radiation;
  a readout circuit configured to perform, during a first frame period, a first readout to obtain a respective output signal associated with each respective detector of the detector array; and
  a selection circuit configured to selectively couple the detector array to the readout circuit;

a control signal generator configured to apply, during the first frame period, a first predetermined signal pattern to a first portion of the selection circuit, wherein the first portion of the selection circuit is associated with a first subset of detectors of the detector array;

a verification device configured to determine whether the first portion of the selection circuit is operating properly based at least on the output signal associated with the detectors of the first subset from the first readout; and an image processing device configured to generate an image based at least on the output signals of the detectors of the detector array not among the first subset of detectors.

15. The imaging device of claim 14, wherein the first predetermined signal pattern is one of a plurality of predetermined signal patterns, and wherein the verification device is configured to determine whether the first portion of the selection circuit is operating properly based on the output signals of the detectors of the first subset in response to each of the plurality of predetermined signal patterns.

16. The imaging device of claim 14, wherein the focal plane array comprises a unit cell array, wherein each unit cell of the unit cell array comprises a detector of the detector array and a portion of the selection circuit, and wherein the portion comprises a plurality of switches.

17. The imaging device of claim 14, wherein:

the control signal generator is further configured to apply, during a second frame period, a second predetermined signal pattern to the first portion of the selection circuit;

the readout circuit is further configured to perform, during the second frame period, a second readout to obtain a respective output signal associated with each respective detector of the detector array; and the verification device is configured to determine whether the first portion of the selection circuit is operating properly based at least on the output signal associated with the detectors of the first subset from the first and second readouts.

18. The imaging device of claim 14, wherein:

the control signal generator is further configured to apply, during a second frame period, a second predetermined signal pattern to a second portion of the selection circuit, wherein the second portion of the selection circuit is associated with a second subset of detectors of the detector array;

the readout circuit is further configured to perform, during the second frame period, a second readout to obtain a respective output signal associated with each respective detector of the detector array; and the verification device is further configured to determine whether the second portion of the selection circuit is operating properly based at least on the output signal associated with the detectors of the second subset from the second readout.

19. The imaging device of claim 14, wherein the image processing device is further configured to determine pixel values for the first subset of detectors based on the output signal of one or more of the detectors not among the first subset of detectors, and wherein the image is based on the pixel values and the output signals of the detectors not among the first subset of detectors.

20. The imaging device of claim 14, wherein the selection circuit comprises:

a first plurality of transistors, wherein each transistor of the first plurality is configured to selectively short a respective one of the plurality of detectors;

a second plurality of transistors, wherein each transistor of the second plurality is configured to selectively provide a bias signal to a respective one of the plurality of detectors; and a third plurality of transistors, wherein each switch of the third plurality is configured to selectively couple a respective one of the plurality of detectors to the readout circuit; wherein:

the first predetermined signal pattern comprises a first signal level associated with a first control signal, a second signal level associated with a second control signal, and a third signal level associated with a third control signal;

the first plurality of transistors comprises a first set of transistors associated with the first subset of detectors;

the second plurality of transistors comprises a second set of transistors associated with the first subset of detectors;

the third plurality of transistors comprises a third set of transistors associated with the first subset of detectors;

during the first frame period:
  the first set of transistors is configured to receive the first control signal;
  the second set of transistors is configured to receive the second control signal; and
  the third set of transistors is configured to receive the third control signal.

* * * * *

UNITED STATES PATENT AND TRADEMARK OFFICE
CERTIFICATE OF CORRECTION

| | | |
|---|---|---|
| PATENT NO. | : 12,250,479 B2 | Page 1 of 1 |
| APPLICATION NO. | : 17/974255 | |
| DATED | : March 11, 2025 | |
| INVENTOR(S) | : Randy J. Hansen and Naseem Y. Aziz | |

It is certified that error appears in the above-identified patent and that said Letters Patent is hereby corrected as shown below:

In the Specification

In the RELATED APPLICATIONS:

Column 1, Lines 16-17 change "U.S. patent application Ser. No." to --U.S. Patent Application No.--.

Signed and Sealed this
Twenty-second Day of April, 2025

Coke Morgan Stewart
*Acting Director of the United States Patent and Trademark Office*